Patented July 23, 1946

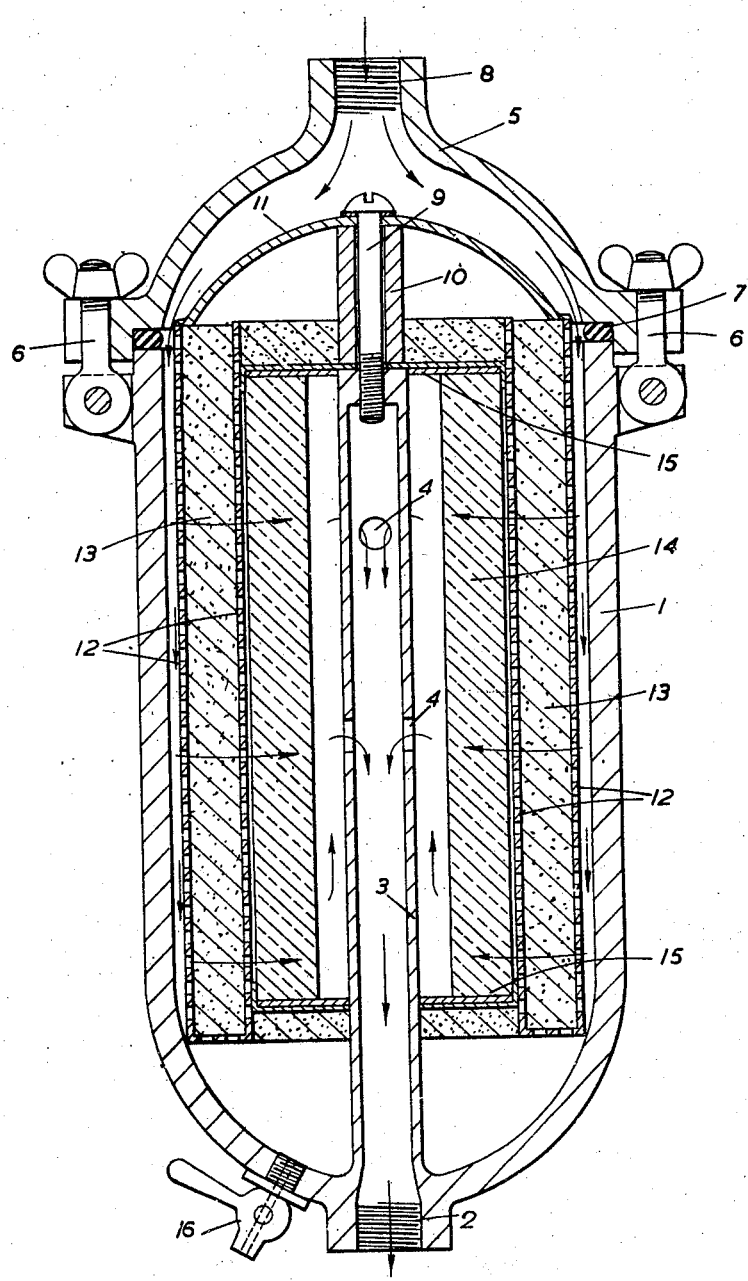

2,404,468

UNITED STATES PATENT OFFICE 2,404,468

FILTER FOR GASES UNDER PRESSURE

Cecil Gordon Vokes and Edward Arthur Stokes, London, England; said Stokes assignor to Vokes Limited, London, England Application September 1, 1943, Serial No. 500,874
In Great Britain September 17, 1942

3 Claims. (Cl. 183—49)

There are cases where it is desired to remove liquid products and solid bodies from air or other gases of rather high temperature and under rather high pressure. The present invention is designed to provide a compact and convenient device which will dissipate a considerable amount of heat and deflect heavier solid particles and remove or absorb moisture before an inner filter wall is reached to eliminate to the necessary extent the remaining solid bodies. More especially it is designed for use in combination with a cordite or like explosive cartridge used to generate pressure to supply power for instance to a jack, or for performing other useful work, often as stand-by or emergency equipment. The improved filter is intended to withstand the heat and pressure and to remove deleterious products of combustion, solid and liquid.

The invention includes in a pressure resisting container means to deflect the entering products from direct impact on the walls of a filter unit in the form of a basket packed with granules of heat-withstanding absorptive material, and a unit of heat-resisting porous material through which the gases afterwards pass before emerging from the outlet.

The above and other parts of the invention are embodied in a typical form shown upon the accompanying drawing, the parts for which a monopoly is desired being those delimited by the claims.

The drawing is a vertical section of a cylindrical filter.

A pressure resisting casing 1 has a central outlet 2 at the bottom with an integral tube 3 extending up from it with apertures 4 in its central and upper part giving access from the central zone of the filter to the outlet. A cover 5 suitably clamped by bolts 6 and jointed by ring 7 to the casing 1 has a central inlet 8. Outer and inner filter units are carried at the top of the tube, a screw 9 with an appropriate distance piece 10 carrying an upper shield 11 covering the tops of the units and securing the units in position to the top of the tube. The outer unit is in the form of an annular basket 12 packed with granules 13 of heat-withstanding absorptive material for instance silica gel or plaster of Paris. Similar material can be retained at the top and bottom of the cylindrical space enclosed by the basket or these can simply be closed. The inner unit can be a tubular insert 14 of suitable heat resisting porous material, possibly a ceramic material, held between end caps 15.

Gas entering by the central inlet 8 at once expands in the head of the filter and tends to be cooled also by contact with the metal of the enclosure. The shield 11 deflects the gases and heavier bodies towards the outer wall, giving substantial cooling and moisture thrown out on to the deflector is also directed to the cylindrical wall so that it drains to the base of the casing. As the gases pass the periphery of the shield 11 the area becomes restricted and further expansion and cooling take place in the annular space surrounding the outer unit. The gas then passes through the absorptive material 13 and (in a relatively dry state) through the porous insert 14 into the central space and thence through the apertures 4 in the upwardly extending tube 3 and so to the outlet 2, which is preferably of the same or substantially the same area as that of the inlet. A drain cock 16 or trap can be used for withdrawing the moisture from the bottom of the casing.

We claim:

1. In a filter designed more particularly for treatment of relatively high-pressure gases charged with liquid, said filter comprising a casing having an inlet and an outlet for such gases, an initially acting outer filter of a material serving to materially absorb the water content of the gases passing therethrough and reducing the heat of such gases, and a final acting inner filter unit of a material to remove particle content of such gases after passing through the outer filter unit, the outer filter unit being spaced from the casing to provide a receiving channel, the inner filter unit defining a central discharge area, a tube extending throughout the central discharge area and open thereto, said tube opening to the casing discharge, and an impervious shield connected to and supported by the tube arranged between the casing inlet and filter units and directing incoming gases to said receiving channel while preventing admission of the gas to the outer filter unit from the casing inlet.

2. In a filter designed more particularly for treatment of relatively high-pressure gases charged with liquid, said filter comprising a casing having an inlet and an outlet for such gases, an initially acting outer filter of a material serving to materially absorb the water content of the gases passing therethrough and reducing the heat of such gases, and a final acting inner filter unit of a material to remove particle content of such gases after passing through the outer filter unit, the outer filter unit being spaced from the casing to provide a receiving channel, the inner filter unit defining a central discharge area, a tube forming an integral part of the casing and extending throughout the central discharge area and open thereto, said tube opening to the casing discharge, and an impervious shield arranged between the casing inlet and filter units and directing incoming gases to said receiving channel while preventing admission of the gas to the outer filter unit from the casing inlet.

3. In a filter designed more particularly for treatment of relatively high pressure gases charged with liquid, said filter comprising a casing having an inlet and an outlet for such gases, an initially acting outer filter to materially absorb the water content of the gases passing therethrough and reducing the heat of such gases, and a final acting inner filter unit of a material to remove particle content of such gases after passing through the outer filter unit, the outer filter unit comprising a perforated basket and a filling of heat-withstanding absorptive material being spaced from the casing to provide a receiving channel, the inner filter unit defining a central discharge area, a tube extending throughout the central discharge area and open thereto, said tube opening to the casing discharge, and an impervious shield arranged between the casing inlet and filter units and directing incoming gases to said receiving channel while preventing admission of the gas to the outer filter unit from the casing inlet.

CECIL GORDON VOKES.
EDWARD ARTHUR STOKES.